US011825187B2

(12) United States Patent
Wang

(10) Patent No.: US 11,825,187 B2
(45) Date of Patent: Nov. 21, 2023

(54) TRANSFERRING PREVIEW STREAMS OF CAMERAS

(71) Applicant: Ping-Chun Wang, New Taipei (TW)

(72) Inventor: Ping-Chun Wang, New Taipei (TW)

( * ) Notice: Subject to any disclaimer, the term of this patent is extended or adjusted under 35 U.S.C. 154(b) by 0 days.

(21) Appl. No.: 17/092,222

(22) Filed: Nov. 7, 2020

(65) Prior Publication Data

US 2022/0150416 A1 May 12, 2022

(51) Int. Cl.
*H04N 23/63* (2023.01)
*H04W 4/02* (2018.01)
*H04L 67/06* (2022.01)
*H04N 7/18* (2006.01)
*H04N 1/00* (2006.01)
*H04N 23/62* (2023.01)
*H04N 23/60* (2023.01)
*H04N 23/661* (2023.01)

(52) U.S. Cl.
CPC .......... *H04N 23/632* (2023.01); *H04L 67/06* (2013.01); *H04N 1/00244* (2013.01); *H04N 7/181* (2013.01); *H04N 23/62* (2023.01); *H04N 23/64* (2023.01); *H04N 23/661* (2023.01); *H04W 4/025* (2013.01)

(58) Field of Classification Search
CPC .... G06F 1/1616; G06F 1/1626; G06F 1/1686; H01H 15/10; H01H 2231/002; H01H 2231/022; H01H 2231/046; H01H 15/14; H04N 5/2257; H04N 5/232; H04N 5/232941; H04N 5/2252; H04N 5/232411
See application file for complete search history.

(56) References Cited

U.S. PATENT DOCUMENTS

| 2004/0201741 A1* | 10/2004 | Ban | H04N 23/64 386/E5.072 |
| 2017/0366591 A1* | 12/2017 | Thomas | H04L 67/06 |
| 2017/0374280 A1* | 12/2017 | Chan | H04N 1/00183 |
| 2020/0084371 A1* | 3/2020 | Guo | H04N 23/63 |

* cited by examiner

*Primary Examiner* — Timothy J Henn

(57) ABSTRACT

A transferring preview stream method provides services to share a preview stream from one client selecting a function of taking photos or videos to another client selecting a function of preview. Clients engaging in a communication session and executing a camera function are configured to periodically receive current location information provided by their location-aware components and transfer it to system for establishing a predetermined area based on their current location information, camera function group and relationship table. The method may be intended to set up transmission sessions between clients in the camera function group for transferring preview streams from clients selecting the function of taking photos or videos to another clients selecting the function of preview. The clients selecting the function of preview may be able to adjust the camera parameters of another clients selecting the function of taking photos or videos in order to confirm user's satisfactory poses and get good quality of photos or videos.

18 Claims, 10 Drawing Sheets

TRANSFERRING PREVIEW STREAMS OF CAMERAS

BACKGROUND

It is popular to use a client such as a smartphone, tablet, laptop and DSC to take photos or videos, users can instantly share photos or videos on social media over a network, especially by using a smartphone. Mostly the rear-facing camera's resolution of smartphone is higher than the front-facing one. They may prefer using the rear-facing camera to take photos or videos, rather than the front-facing one. Due to a convenient way to check their poses on a screen of smartphone, they sometimes use a front-facing camera taking photos or videos.

Many users like to use selfie stick taking photos or videos for themselves. They usually make sure of their poses by checking a preview stream of smartphone's front-facing camera on the screen before pressing a button of taking photos or videos. The preview stream is a sequence of images captured by a camera of smartphone typically at a thirty frames per second. To make smartphone carried conveniently, it may limit a size of smartphone, a LCD screen, a distance from a user to a LCD screen and a length of selfie stick.

Generally, users have to waste a lot of time on repeatedly confirming photos or videos which they took when it is hard to check preview streams on a LCD screen. For example, someone else taking photos or videos for users, user's pose causing they cannot see a smartphone's screen and a smartphone's screen being far from users. Users do not satisfy photos or videos which they took, they have to delete photos or videos and take again. Additionally, someone else never know when users are ready to be taken photos or videos, they have to waste a period of time to wait or confirm. It is not an efficient way to photos or videos.

SUMMARY

The document describes method and system for providing services to share preview stream from one client selecting a function of taking photos or videos to another client selecting a function of preview. Clients engaging in a communication session and executing a camera function may be configured to periodically receive current location information provided by their location-aware components and formed a new group by determining that they locate within an predetermined area created by the system based on the current location information. The system may establish a relationship table for the clients in the new group. Additionally, a client moves away the predetermined area, it may be released from the communication session and list relationship table. The proximity of distance predetermined area may allow to be predetermined by a service provider or app developer.

Servers may receive requests of transferring preview streams from clients in the relationship table selecting function of preview or taking photos or videos through the communication session. The method may be intended to set up transmission sessions between clients in the relationship table and servers for transferring preview streams from clients selecting the function of taking photos or videos to another clients selecting the function of preview. The clients selecting a function of taking photos or videos may transmit preview streams to servers, and then servers may transfer preview streams to the clients selecting the function of preview through the communication session respectively.

However, the clients participating in the relationship table and selecting the function of taking photos or videos may directly transfer preview streams through the communication session to the clients selecting the function of preview without going through the servers.

The clients selecting the function of preview may be permitted to change the parameters of cameras of the clients selecting the function of taking photos or videos through the communication session in order to get good quality of photos or videos. A user may be allowed to simultaneously have one or more clients engaging in the communication session. The users selecting the function of preview may directly check their poses by watching the preview streams on their LCD screen, especially the clients of taking photos or videos being far from them or when they are difficult to face at the cameras of the clients of taking photos or videos. It may save a lot of time on repeatedly confirming photos or videos which they took and the battery life of the clients.

The present disclosure describes the following implementations, a transferring preview streams method comprises confirming, by at least one user, their satisfactory pose and image's quality through preview streams of photographing them on their clients. The method comprises requesting, by the highest priority client of a plurality of the clients executing a preview function or taking photos or videos, adjustments on cameras' parameters of at least one additional client executing a function of taking photos or videos for improving the quality of their images. The method comprises providing, by the at least one additional client, the allowable cameras' parameters to the highest priority client in response to an acknowledgment of the at least one additional client. The method comprises generating a control table in the relationship tables based on the allowable cameras' parameters on both of the highest priority client and at least one additional client. The method comprises capturing, by the highest priority client, an image from its preview streams for changing position of the at least one additional client. The method comprises shifting, by a user using the highest priority client, the image on their control table to determine the at least one additional client must be moved to the favorite position based on the shifted image. The method comprises moving, by another user handling the at least one additional client, the at least one additional client according to the shifted image until it reaches the favorite position. The method comprises inspecting, by the user, the favorite position through current preview streams of the highest priority client in response to a notification of the at least one additional client when it reaches the favorite position. The method comprises adjusting, by the user, the allowable cameras' parameters through the control table after acknowledging the favorite position of the at least one additional client. The method comprises checking, by the at least one user, their poses shown on their clients while the highest priority client is adjusting the allowable cameras' parameters. The method comprises notifying, by the highest priority client, other clients it's time taking photos or videos after the highest priority client finishes adjustments of the allowable cameras' parameters and they confirm their poses.

The method further comprises Initiating, by at least one user deciding to take photos or videos, a function of preview or taking photos or videos when they are particularly difficult to check their image through preview streams of their clients, requesting current location information provided by location-aware components of each client of the plurality of clients, in response to executing the function of preview or taking photos or videos by the plurality of clients, and generating a predetermined area based on their current location information, camera function group and relationship table for the plurality of clients executing the function of preview and or taking photos or videos, the relationship table determining the direction of transmitting preview streams, photos or videos between the plurality of clients.

The method further comprises building an order in which the plurality of clients execute the function of preview or taking photos or video into the relationship table, and creating a priority for the plurality of clients in the relationship table according to the order for adjusting a set of allowable cameras' parameters of each client executing the function of taking photos or videos.

The method further comprises determining the client executing the function of preview is higher than one executing the function of taking photos or videos in the priority for adjusting the set of allowable cameras' parameters, assigning the first one client executing the function of preview in the order to the highest priority for adjusting the set of allowable cameras' parameters of each client executing the function of taking photos or videos, and substituting subsequent clients executing the function of preview or taking photos or videos in the order for the highest priority when the first one client is unavailable.

The method further comprises updating the camera function group and relationship table when a client or new client executing the camera function leaves or participates in the predetermined area, and refreshing the order and priority for the plurality of clients executing the function of preview or taking photos or videos.

The method further comprises capturing, by the at least one additional client, its current preview streams generating consecutive images while its position is adjusting, demonstrating overlapping images of each of the consecutive images and the shifted image on the control table of the at least one additional client until it reaches the favorite position, and notifying, by the at least one additional client, the highest priority client about that it reaches the position in response to one of the consecutive images almost matches the shifted image.

The non-transitory computer-readable medium storing instructions that, when executed by a processor, cause the processor to implement a method comprises confirming, by at least one user, their satisfactory pose and image's quality through preview streams of photographing them on their clients. The method comprises requesting, by the highest priority client of a plurality of the clients executing a preview function or taking photos or videos, adjustments on cameras' parameters of at least one additional client executing a function of taking photos or videos for improving the quality of their images. The method comprises providing, by the at least one additional client, the allowable cameras' parameters to the highest priority client in response to an acknowledgment of the at least one additional client. The method comprises generating a control table in the relationship tables based on the allowable cameras' parameters on both of the highest priority client and at least one additional client. The method comprises capturing, by the highest priority client, an image from its preview streams for changing position of the at least one additional client. The method comprises shifting, by a user using the highest priority client, the image on their control table to determine the at least one additional client must be moved to the favorite position based on the shifted image. The method comprises moving, by another user handling the at least one additional client, the at least one additional client according to the shifted image until it reaches the favorite position. The method comprises inspecting, by the user, the favorite position through current preview streams of the highest priority client in response to a notification of the at least one additional client when it reaches the favorite position. The method comprises adjusting, by the user, the allowable cameras' parameters through the control table after acknowledging the favorite position of the at least one additional client. The method comprises checking, by the at least one user, their poses shown on their clients while the highest priority client is adjusting the allowable cameras' parameters. The method comprises notifying, by the highest priority client, other clients it's time taking photos or videos after the highest priority client finishes adjustments of the allowable cameras' parameters and they confirm their poses.

The system comprises one or more processors, and one or more non-transitory computer-readable media storing instructions that, when executed by the one or more processors, cause the system to perform operations comprises confirming, by at least one user, their satisfactory pose and image's quality through preview streams of photographing them on their clients. The method comprises requesting, by the highest priority client of a plurality of the clients executing a preview function or taking photos or videos, adjustments on cameras' parameters of at least one additional client executing a function of taking photos or videos for improving the quality of their images. The method comprises providing, by the at least one additional client, the allowable cameras' parameters to the highest priority client in response to an acknowledgment of the at least one additional client. The method comprises generating a control table in the relationship tables based on the allowable cameras' parameters on both of the highest priority client and at least one additional client. The method comprises capturing, by the highest priority client, an image from its preview streams for changing position of the at least one additional client. The method comprises shifting, by a user using the highest priority client, the image on their control table to determine the at least one additional client must be moved to the favorite position based on the shifted image. The method comprises moving, by another user handling the at least one additional client, the at least one additional client according to the shifted image until it reaches the favorite position. The method comprises inspecting, by the user, the favorite position through current preview streams of the highest priority client in response to a notification of the at least one additional client when it reaches the favorite position. The method comprises adjusting, by the user, the allowable cameras' parameters through the control table after acknowledging the favorite position of the at least one additional client. The method comprises checking, by the at least one user, their poses shown on their clients while the highest priority client is adjusting the allowable cameras' parameters. The method comprises notifying, by the highest priority client, other clients it's time taking photos or videos after the highest priority client finishes adjustments of the allowable cameras' parameters and they confirm their poses.

DESCRIPTION OF THE DRAWINGS

Like reference symbols in the various drawings indicate like elements.

DETAILED DESCRIPTION

Figure 1:
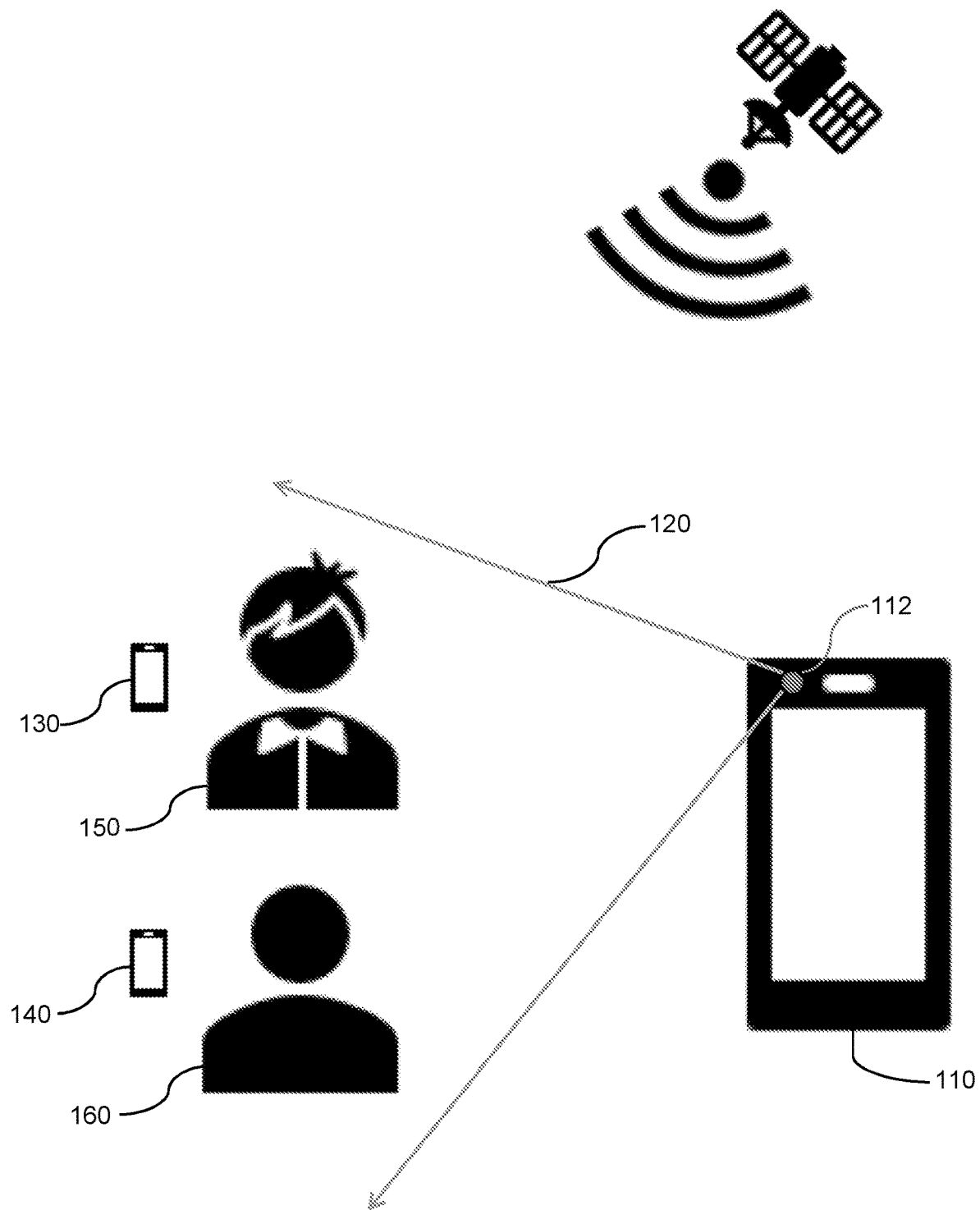
FIG. 1 is a viewpoint of cameras taking photos or videos in the front or back of people.

FIG. 1 is a viewpoint of cameras taking photos in the front or back of people. The clients 110, 130 and 140 are computing devices such as smartphones and connected together through communication session over one or more networks due to locations of the clients 110, 130 and 140 are in within the predetermined area. Generally, most of smartphones support at least one front-facing and rear-facing cameras. The rear-facing cameras which are often used to take photos or videos may be higher resolution than the front-facing cameras. The camera 112 is a rear-facing camera, the line 120 is a virtual view angle of the camera 112. The person 150 and 160 are facing and opposite the camera 112, respectively. The camera 112 can capture a preview stream and transmit to the clients 130 and 140 when the person 150 and 160 want to take photos or videos. The person 150 and 160 can make sure of their poses by checking the preview stream on the displays of clients 130 and 140, respectively. The person 150 and 160 may adjust the parameters of the camera 112 and take photos or videos through interfaces of apps (applications) such as a chat app on the client 130 and 140, respectively.

Figure 2:
FIG. 2 is a viewpoint of cameras taking photos or videos at people being far from cameras.

FIG. 2 is a viewpoint of cameras taking photos or videos at people being far from cameras. The distance between a user and camera may be over 5 meters, the selfie stick is not convenient to take photos or videos, and the user can not clearly see a preview stream on their LCD display. For example, person 250 is dancing and a group of people 230 are over 10 meters away. The clients 210, 220 and 240 are computing devices such as smartphones and connect together through a communication session over one or more networks due to the locations of the clients 210, 220 and 240 are in the predetermined area. The cameras of the client 210 can capture a preview stream and transmit to the clients 220 and 240 when the group of people 230 and person 250 want to take photos or videos. They can make sure of their poses by checking the preview stream on the displays of the clients 220 and 240, respectively. They may adjust the parameters of the cameras of the client 210 and take photos or videos through interfaces of apps on their clients.

Figure 3:
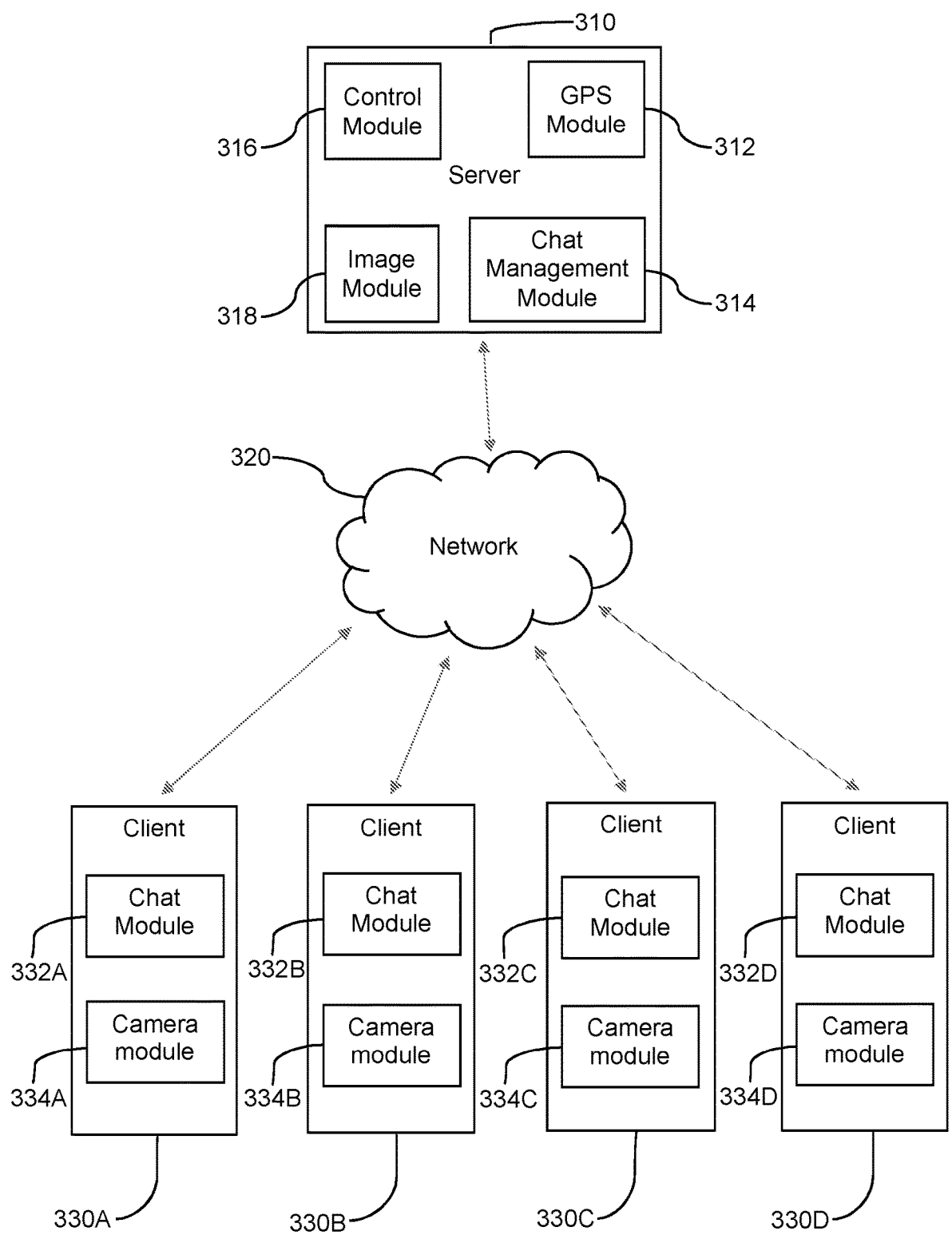
FIG. 3 is a block diagram of a system that may be used to implement the methods and systems described in the document.

FIG. 3 is a block diagram of a system that may be used to implement the methods and systems described in the document. The system described herein includes server 310, network 320 and multiple clients (330A, 330B, 330C and 330D). The server 310 may consist of multiple servers and connect with multiple clients via the network 320. In one implementation, other such entities may also exist in the system and be connected to the network 320. The server 310 includes GPS module 312, chat management module 314, control module 316 and image module 318. The server 310 may be remote and communicate with the multiple clients 330 via the network 320, and implement methods by using one or more computers and a cloud platform. The server 310 may provide chat services, video services, image services and other services.

The network 320 is implemented by using standard protocols of communication such as Dynamic Host Configuration Protocol (DHCP), File Transfer Protocol (FTP), Hyper Text Transfer Protocol (HTTP), Internet Message Access Protocol (IMAP), Network News Transport Protocol (NNTP), Network Time Protocol (NTP), Post Office Protocol—Version 3 (POP3), Simple Mail Transfer Protocol (SMTP), Simple Network Management Protocol (SNMP), Multi-Protocol Label Switching (MPLS) and Transmission Control Protocol/Internet Protocol (TCP/IP). In one implementation, the 5th generation mobile networks (5G) may be one of suitable communication technologies. High bit-rate and low network-latency of 5G network may make preview stream and video transferred smoothly between clients.

The multiple clients 330 are computing devices, which can transmit and receive data via the network 320, such as smartphone, pad, tablet or notebook. A user can use the multiple clients 330 to execute apps such as chat app, camera app and other apps. The multiple clients 330 include a chat module 332 and camera module 334. The chat module 332 may be a module to implement chat functionalities of the multiple clients 330 and communicate with the server 310 via the network 320. The chat module 332 allows one user of the multiple clients 330 to initiate chat sessions with other users of the multiple clients 330, and these users of the multiple clients 330 can exchange messages, photos, videos and preview streams with each other. According to the initiation of chat session, the chat module 332 may send a request to the server 310 to set up the chat sessions for the multiple clients 330. For example, the user of the client 330A deliberately creates a chat group for exchanging information and invites the user of the client 330B to join the chat group. The chat module 332A interacts with the chat management module 314 of the server 310 via the network 320 to create the chat group and send a request of the invitation to the chat module 332B. The chat module 332B receives the message and shows it on the display of the client 330B. The user of the client 330B can determine to reply a message of rejection or acceptance to the chat management module 314 and the chat module 332A.

The chat module 332 may allow one or more users in the chat group to create another group for a function of preview in order to watch a preview stream captured by the camera module 334. The new group for the function of camera may be initiated by locations of the multiple clients 330 in a predetermined area which is defined by the GPS module 312. The chat management module 314 of the server 310 may receive the information of detection about the multiple clients 330 locating within the predetermined area and create the new group for the camera function. For example, the client 330A and client 330B of the chat group which includes client 330A, client 330B, client 330C and client 330D meet together and locate within the predetermined area, a new chat group for the camera function (called a camera function group) is established only for the client 330A and client 330B. The client 330C and client 330D cannot see the camera function group while the client 330A and client 330B execute the camera function. Assuming the client 330C or client 330D not locating within the predetermined area executes the camera function, the chat management module 314 cannot recruit the client 330C or client 330D into the camera function group. The chat management module 314 may set up a relationship table shown on the displays of the client 330A and client 330B for the camera function.

The chat module 332 may include two different frequency values for receiving a location information from the GPS satellites and transmitting the location information to the server 310 respectively, and a function of determining a client moving by comparing the current position information and previous one. In one implementation, a client can receive the location information from the GPS satellites according to the frequency value, and compare the previous and current location information to check that the client is moving or not. While the user is moving, the client has to periodically transmit the current location information to the server 310. Otherwise, the client determines not to transmit the current location information to the server 310 in order to save a power consumption.

The camera module 334 may allow the client 330A and client 330B in the camera function group to adjust parameters of each other's cameras such as optical zoom, digital zoom, compression, frame rate, resolution, snapshot and flash. The camera module 334 may also permit the client 330A and client 330B to make a lot of controls to the each other's cameras such as exchange of front-facing and rear-facing cameras, oral control and other functions. For example, the user of client 330A wants to make photos for the user of the client 330B. The client 330B executes the preview function and get the preview stream from the client 330A. The user of the client 330B may be permitted to change parameters of the client 330A's cameras through the control table to make a snapshot by oral control.

Figure 4:
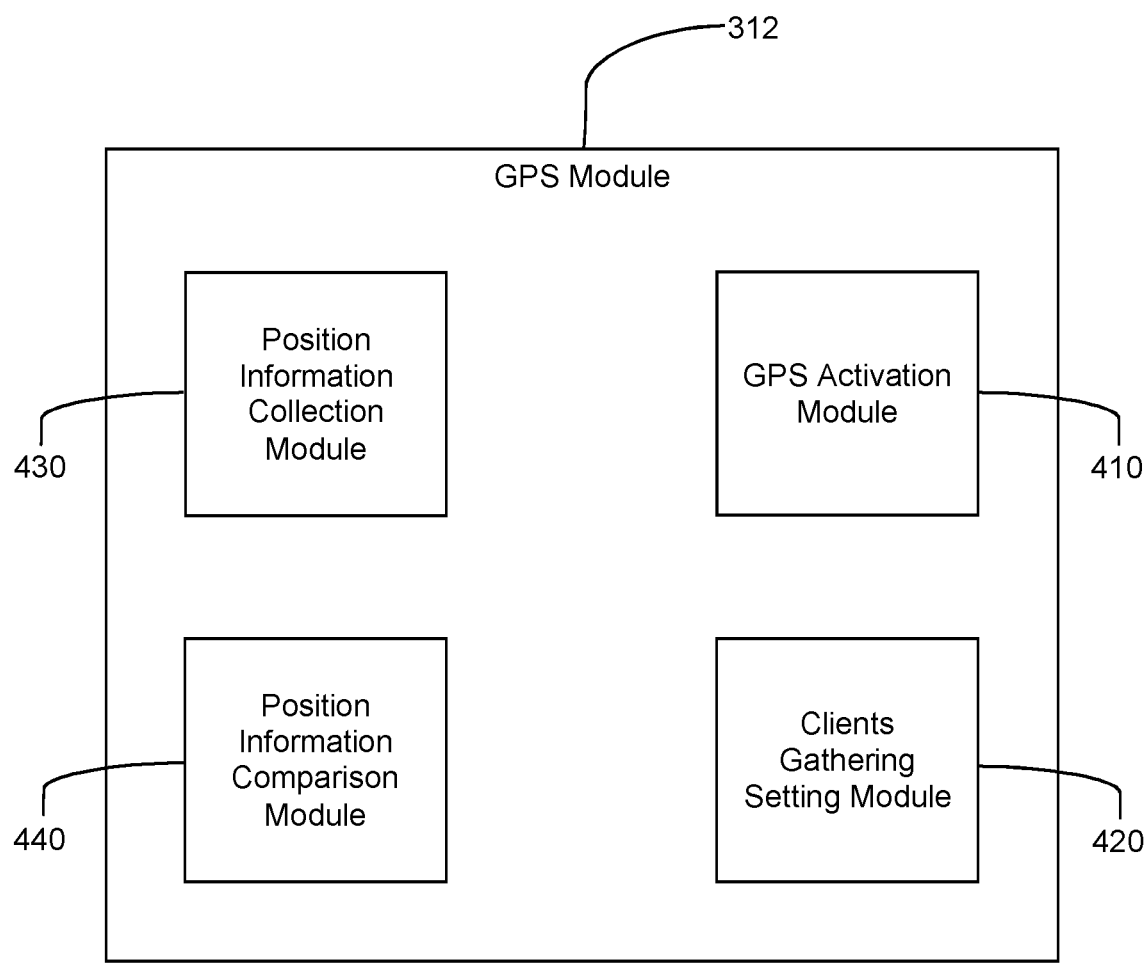
FIG. 4 is a block diagram illustrating the GPS module of the server.

FIG. 4 is a block diagram illustrating the GPS module of the server. The GPS module 312 built in the server 310 includes GPS activation module 410, predetermined area setting module 420, position information collection module 430 and position information comparison module 440. The GPS activation module 410 may be intended to activate GPS functions of all clients in the camera function group in response to all clients executing the camera function and deactivate the GPS functions when the camera function finishes. In one implementation, the GPS activation module 410 may be configured to activate GPS functions of all clients in the chat group in order to periodically transmit their location information to the server 310. While the clients executing the camera function in the chat group meet together and locate within the predetermined area, the server 310 may transmit messages to these clients and then make the camera function group automatically created. In another implementation, GPS functions of a client within the predetermined area and without executing the camera function may not be activated by the GPS activation module 410.

The predetermined area setting module 420 is a module to configure an area which is formed according to the locations of all clients in the camera function group. The predetermined area setting may be configured by a service provider or app designer. The area may be formed in a line or any kind of shape such as star, circle, hexagon, rectangle, triangle or others. The predetermined area setting module 430 may determine positions of all clients gathering together to be a center of an area. For example, the client 330A selecting to take of photos and client 330B selecting a preview function in the camera function group meet together for taking photos. The server 310 receives their location information and transfer to the predetermined area setting module 430. The predetermined area setting module 430 may determine the predetermined area to be a line and configure the clients 330A and 330B to be the start and end of the line. Assuming the client 330D executing the camera function goes into the area established for the clients 330A and 330B, the area may be changed instantly.

The position information collection module 430 is a module to periodically collect a location information of a client according to frequency values. The frequency values described herein are used to determine frequencies of receiving a location information from the GPS satellites and transmitting the location information to the server 310 respectively by clients in the camera function group. These frequency values stored in the position information collection module 430 may be configured by an app designer. The server 310 may configure the frequency values to two different timers of all clients in the camera function group in order to receive their location information and transfer their position information to the position information collection module 430. In one implementation, a GPS module of a client may frequently miss GPS signals from the GPS satellites and not form a position of the client. The GPS module of the client may transmit the previous position instead of the current one to the position information collection module 430.

The position information comparison module 440 is a module to use a location information of a client in a camera function group to make a comparison with positions on the boundary of predetermined area, and may be activated while the client is executing the camera function. The predetermined area setting module 430 may be intended to transfer the positions of the boundary to the position information comparison module 440 when a camera function group is established. When the client executes the camera function, the position information comparison module 440 may check the client either existing or not in the camera function group by comparing the positions of boundary of predetermined area with the current location information of the client in the position information collection module 430. Regarding the result of the client leaving the camera function group, the position information comparison module 440 may must transfer the result to the chat management module 314 for removing the client from the camera function group.

Figure 5:
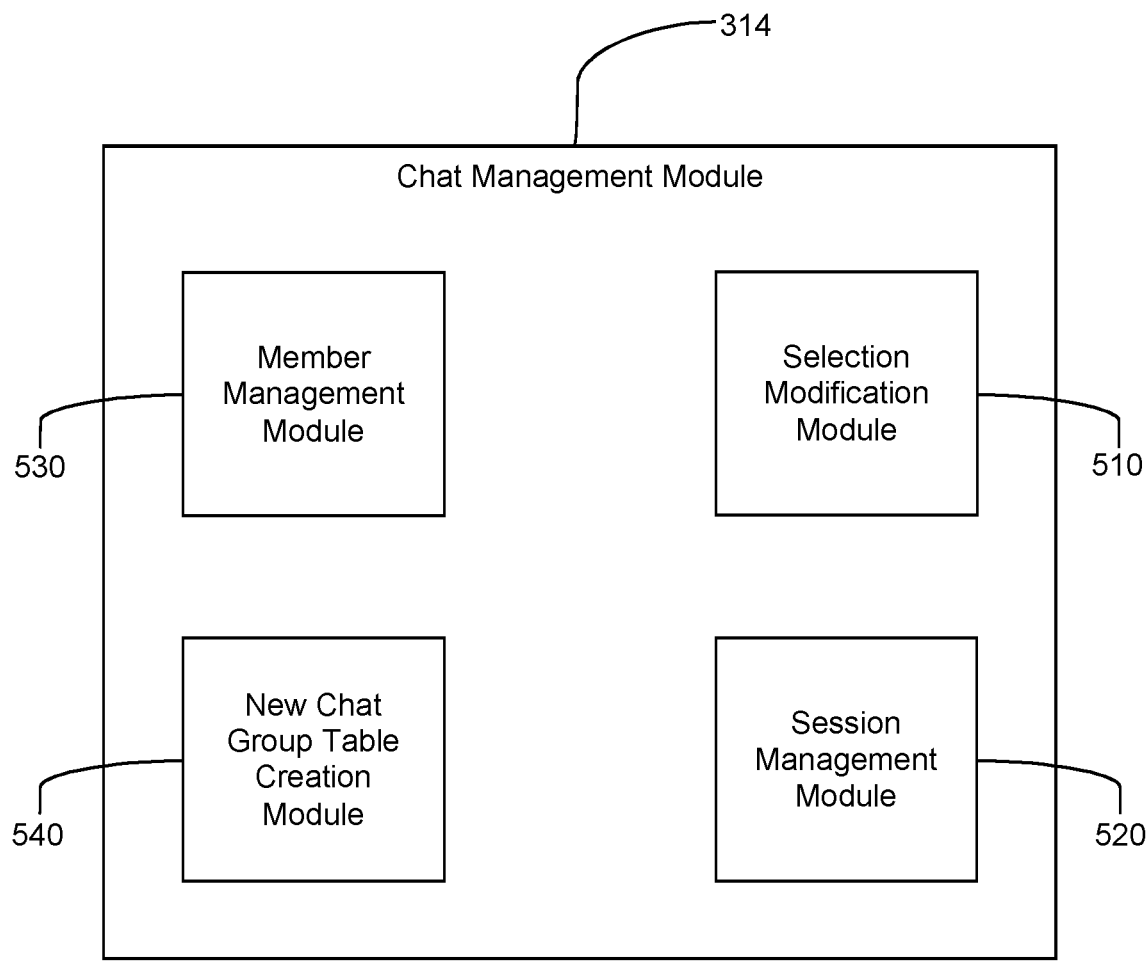
FIG. 5 is a block diagram illustrating the chat module of the server.

FIG. 5 is a block diagram illustrating the chat module of the server. The chat management module 314 built in the server 310 includes selection modification module 510, session management module 520, member management module 530, new chat group table creation module 540. The selection modification module 510 is a module to create a selection table and manage selections of preview or taking photos or videos for clients in the camera function group. The camera function group is formed when the clients meet together within a predetermined distance range and execute a camera function. The selection modification module 510 may be intended to request selections of the clients in the camera function group in order to create a selection table. Each client in the camera function group can know the choices of all clients in the camera function group through the selection table. The clients selecting the preview function can make a choice to request the preview streams from the other clients taking photos or videos. When the clients finish the function of preview or taking photos or videos, the selection modification module 510 has to change their statuses in the selection table.

The session management module 520 is a module to initiate the communication sessions between clients in the camera function group in response to choosing the camera function. A client in the camera function group chooses a function of taking photos or videos, other clients in the camera function group can request the preview streams from the client in response to choosing the client on the selection table. The session management module 520 receiving the requests from the clients in the camera function group may transfer the identifiers of the clients selecting the preview function to the clients taking photos and videos and initiate communication sessions between these clients in the camera function group. Then the clients taking photos or videos may directly transmit preview streams to the clients selecting the preview function via the network 320. The session management module 520 may end the communication sessions between the clients in the camera function group in relation to the clients finishing the activities of the preview function or taking photos or videos.

The member management module 530 is a module to define a rule to manage clients in the chat group, especially for the camera function group. Some clients consist a list of a chat group including their identifiers by means of the member management module 530. At least two clients belonging to one or another chat group execute the camera function and locate within the distance range, the member management module 530 may set up a camera function group for these clients. For example, the client 330A and client 330B belong to the chat group A and chat group B respectively, they meet together within the distance range. The camera function group may be formed for the client 330A and client 330B after they acknowledge each other. This camera function group is formed for the camera function and exists for a period of time. The member management module 530 may determine to release the camera function group in relation to the camera function being completed, especially the clients finishing the function of taking photos or videos.

The new chat group table creation module 540 is a module to establish a table for a camera function group. The table may be terminated in relation to the camera function group being completed. The table may include identifier, selection of client, name of client's chat group, client's camera parameters and additional factors. Each user in the camera function group may figure out their choices of camera function by checking the table. For example, the client 330A and client 330B belong to the chat group A and chat group B respectively, and they meet together within the distance range. The new chat group table creation module 540 may create a camera function group and table for the client 330A and client 330B for a camera function after they acknowledge each other. The table shows the client 330A and client 330B belong to the chat group A and chat group B respectively, identifiers of the client 330A and client 330B, adjustable items of camera parameters, their selections and other information.

Figure 6:
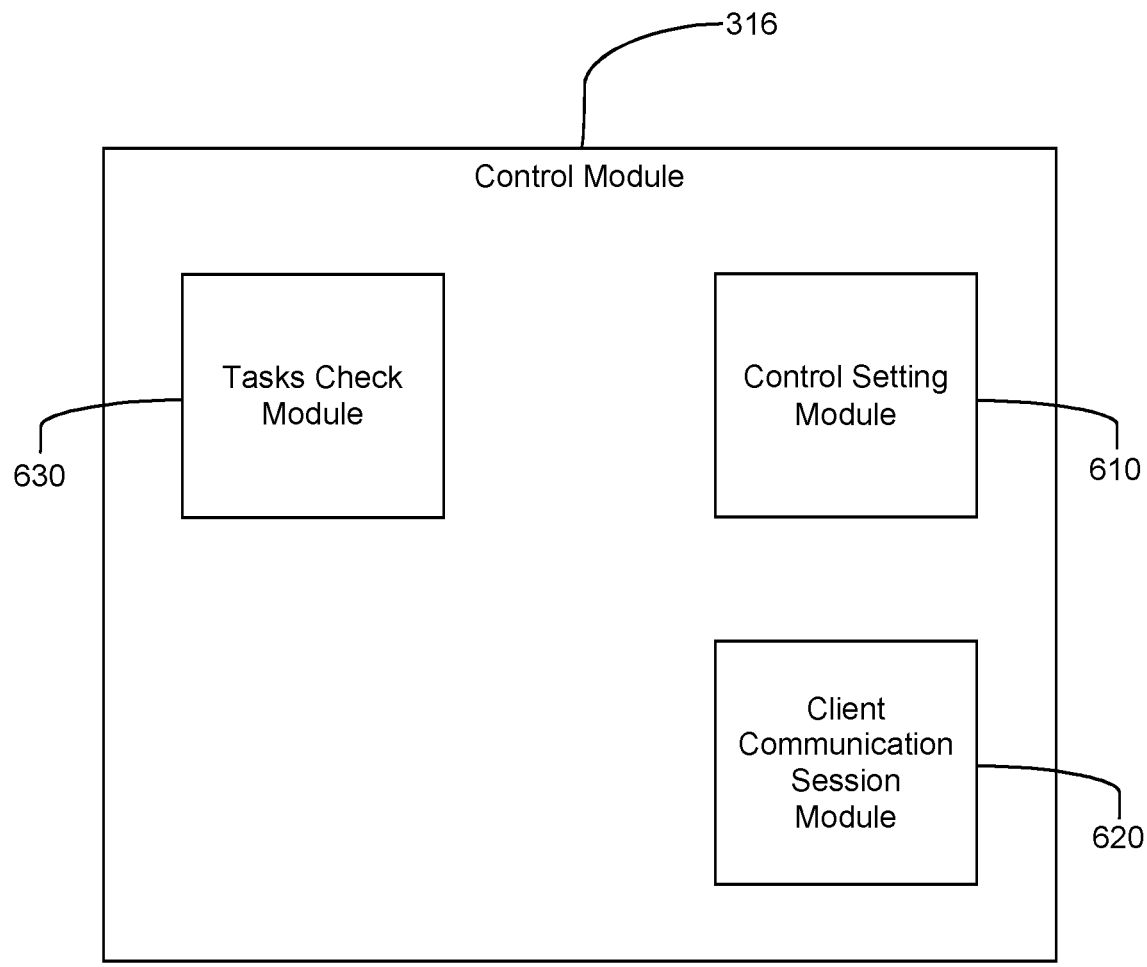
FIG. 6 is a block diagram illustrating the control module of the server.

FIG. 6 is a block diagram illustrating the control module of the server. The control module 316 built in the server 310 includes control setting module 610, client communication session module 620 and tasks check module 630. The control setting module 610 is a module to set up methods to control clients in the camera function group for changing parameters, especially operations for taking photos or videos. A user may configure control methods such as oral control and gesture to control their clients. For example, the user 150 shown in FIG. 1 configure the control methods of the client 130 shown in FIG. 1 in a way of oral control and then input oral commands through microphones of client 130. The control setting module 610 may establish control paths between the oral commands and the parameters of the clients 110 and 130 shown in FIG. 1. Then the user 150 may talk to the client 130 by using the oral commands to control the parameters of the client 110 via the network 320 for some purposes.

The client communication session module 620 is a module to establish a relationship table for clients in the camera function group and configure factors of communication sessions between clients. The factors, such as order, priority and interrupt of communication sessions, may be predetermined by a system and app designer. When a plurality of clients execute the function of preview or taking photos or videos and participate in an predetermined area, the client communication session module 620 may establish a relationship table and camera function group for the plurality of clients. The relationship table defines the direction of transmitting preview streams, photos or videos between the plurality of clients according to their selections. It may build up an order of the plurality of clients executing the function of preview or taking photos or video in order to create a priority for the plurality of clients for adjusting a set of parameters of cameras of each client executing the function of taking photos or videos. The client communication session module 620 may be intended to arrange all clients executing the function of preview or taking photos or video to form two different groups for the priority. One is for the client executing the function of preview, the other is for the client executing the function of taking photos or video. In the priority, the client executing the function of preview may be configured to be higher than the client executing the function of taking photos or video. Moreover, it may intentionally configure the first one client executing the function of preview in the order being the highest priority to adjust the set of parameters of cameras of each client executing the function of taking photos or videos. Additionally, it may substitute subsequent clients executing the function of preview in the order for the highest priority when the first one client is unavailable. However, when all clients executing the function of preview skip adjusting the parameters of cameras, it may determine the client executing the function of taking photos or videos being the highest priority. In one implementation, it may must update the relationship table when an existing or new client executing the function leaves or participates in the predetermined area, and refresh the order and priority for the plurality of clients executing the function of preview or taking photos or videos. The client communication session module 620 may be intended to adopt the priority to limit these clients for executing the camera function, when a bandwidth of the network 320 is not enough to afford their requirement. The network 320 shown in FIG. 3 may limit an amount of clients in the camera function group simultaneously executing the preview function or taking photos or videos, a resolution of a frame and a frame-rate of preview stream.

The client communication session module 620 may configure a queue to manage clients executing the camera function, compression ratio, the resolution of a frame of preview stream or the frame-rate of preview stream for solving the limitation of an amount of clients simultaneously using the network 320. Additionally, the client communication session module 620 may also simultaneously use these three solutions and additional methods to deal with the limitation of an amount of clients. For example, the clients 110, 130 and 140 participating in the camera function group and a lots of other clients simultaneously use the network 320. The client 110 selecting to take photos or videos is configured to transmit preview streams to the clients 130 and 140 choosing the preview function, respectively. The client communication session module 620 may request the data-rate of transmitting preview streams by the client 110 and receiving preview streams by the clients 130 and 140, and determine the compression ratio, the resolution of a frame or the frame-rate of preview streams in order to make the preview streams presented in real time on the displays of the clients 130 and 140.

The client communication session module 620 may configure the priority to manage the selection of clients. The priority of clients selecting the selection may be intended to control an amount of users. For example, clients 110, 130 and 140 have different priority to use the services. The client 130 has the highest priority and the client 110 has the lowest priority. Additionally, the client communication session module 620 may also configure the interrupt function to allow the clients of highest priority to use this service. So, the client 130 may deliberately interrupt the clients 130 and 110 executing the function of preview and taking photos or videos respectively.

The tasks check module 630 is a module to provide the services to clients meeting together and determine their choices. One of these services is that the position information comparison module 440 detects clients executing a camera function and gathering together within a predetermined area and establish a camera function group for these clients. In one implementation, the tasks check module 630 may be intended to provide different types of services with the clients for making choices when they meet together within a predetermined area. The services described herein include a camera function and additional functions.

Figure 7:
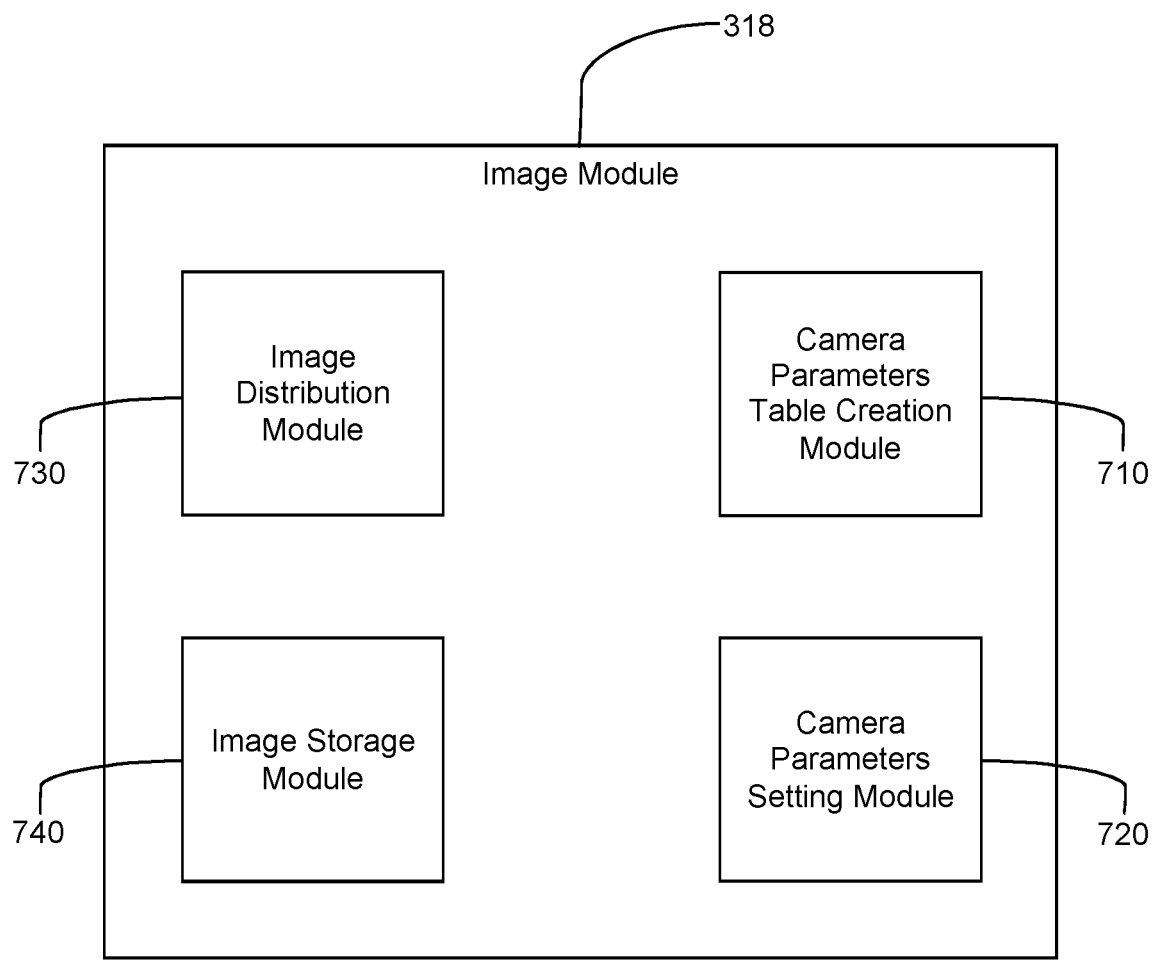
FIG. 7 is a block diagram illustrating the image module of the server.

FIG. 7 is a block diagram illustrating the image module of the server. The image module 318 built in the server 310 includes camera parameters table creation module 710, camera parameters setting module 720, image distribution module 730 and image storage module 740. The camera parameters table creation module 710 is a module to create a control table for the highest priority client executing a preview function controlling camera parameters of an additional client executing a function of taking photos or videos in the camera function group. In one implementation, the system may request allowable cameras' parameters of a new client when it registers a service of camera function, and transfer the allowable cameras' parameters to the camera parameters table creation module 710. The control table is an interface by which a user using the highest priority client executing a preview function adjust camera parameters of a additional client executing a function of taking photos or videos for improving quality of their images, and may be presented on the displays of a the highest priority client and additional client. It may be intended to include into the relationship table and defined by a system or app designer. For example, clients 110, 130 and 140 shown in FIG. 1 meet together and execute the camera function. The control table may be created by the camera parameters table creation module 710 and presented on the displays of the clients 110 and 130. The user 150 may intentionally adjust the camera parameters of the client 110 through the control table.

The camera parameters setting module 720 is a module to establish control paths between the camera parameters of the clients in a camera function group and the control table created by the camera parameters table creation module 710. In one implementation, the highest priority client may capture an image from its current preview streams in order to fine-tune a position of a user using the highest priority client in the image on its control table. The system may permit the user to divide the image into two objects of user's body and background for easy modification of their position in the image. The user may only shift the object of user's body or background to finalize the shifted image on its control table. The shifted image described herein may decide a favorite position of a client executing a function of taking photos or videos. It indicates the position of the client executing a function of taking photos or videos must be moved to the favorite position based on the shifted image. The shifts may be any kind of movement. The camera parameters setting module 720 may be configured to calculate movements of the client taking photos or videos based on shifts of the user handling the highest priority client in the image. The shifted image may indicate a situation the user wants. The situation described herein may include movements of the client taking photos or videos, image's quality the user cannot reach after adjusting the camera parameters through the control table or other conditions. In one implementation, the client taking photos or videos may be attached on a swivel base for movements of 3 dimensions. So, the user handling the highest priority client may shift the image on its control table to directly control the client taking photos or videos moving to the favorite position. However, if there is a support of a swivel base for a client taking photos or videos, only one user may be able to initiate a camera function with at least two clients executing function of preview or taking photos or videos respectively. Otherwise, the camera function may intentionally be initiated by at least two users and clients executing function of preview or taking photos or videos at the same time. In another implementation, the highest priority client may provide the shifted image to the client taking photos or videos for moving itself to the favorite position when no swivel base supports. Another user handling the client taking photos or videos may capably check the shifted image on its control table and move the client taking photos or videos to the favorite position. While another user is adjusting the position of the client taking photos or videos, the client taking photos or videos may be configured to generate consecutive images captured from its current preview streams, and then demonstrate an overlapping image of each of the consecutive images and the shifted image on its control table until it reaches the favorite position. When one of the consecutive images matches the shifted image, it may indicate the client taking photos or videos reaches the favorite position. The highest priority client may receive a notification of the client taking photos or videos about it reaches the favorite position. Additionally, the user may intentionally issue additional instructions attached with the shifted image for improving image's quality. Then, the user may capably adjust the allowable cameras' parameters through the control table after acknowledging the favorite position of the client taking photos or videos. While the highest priority client is adjusting the allowable cameras' parameters, all users in the camera function group can check their poses shown on their clients. After the highest priority client finishes adjustments of the allowable cameras' parameters and they confirm their poses, the highest priority client may be configured to notify other clients it is time to take photos or videos. The camera parameters, such as front-facing, rear-facing, optical zoom, digital zoom, compression, frame rate, resolution, snapshot and flash, of clients may be released by OS (operating system) providers and configured by a system or app designer. The OS providers, such as APPLE, GOOGLE, MICROSOFT, may release different types of camera parameters and control range with an app designer for developing apps. The app designer may classify the different types of camera parameters to be a set of parameters capable of supporting to different OS platforms.

The image distribution module 730 is a module to initiate a process of a distribution for photos or videos in response to establishing communication sessions between clients in a camera function group by the client communication session module 620 based on selections of clients. According to the selections of clients, the photos or videos may be distributed from a client selecting to take photos or videos to another client selecting the preview function via network 320 in response to placing control commands by the client selecting the preview function. The clients without making the selections in the camera function group can request the photos or videos from the server 310 and other clients got the photos or videos. A process of distribution to clients in a camera function group can be configured by a system or app designer.

For example, clients 110, 130 and 140 shown in FIG. 1 consist of a camera function group. The client 110 selecting to take photos or videos, the client 130 selecting a preview function and the client 140 without selecting a function meet together for taking photos or videos. The client 110 or 130 can place control commands to take photos or videos, and the photos or videos may be distributed from the client 110 to client 130 and the server 310. The client 140 can retrieve the photos or videos by requesting the server 310 or client 130. Additionally, the image distribution module 730 may establish the distribution of the photos or videos to be automatically transferred from the client 110 to the client 130 in response to placing control commands to take photos or videos by the client 110 or 130.

The image storage module 740 is a module to arrange a memory area for storing photos or videos captured by clients in a camera function group. The memory area may be arranged at storages of the server 310 and the client selecting to take photos or videos. The procedure of arranging a memory area can be configured by a system or app designer. The image storage module 740 may be predetermined to first store photos or videos in memories of the clients selecting to take photos or videos and then transfer to storages of the server 310 or the clients placing control commands. For example, clients 110, 130 and 140 shown in FIG. 1 consist of a camera function group. The client 110 selecting to take photos or videos, the client 130 selecting a preview function and the client 140 without selecting a function meet together for taking photos. The photos may be first stored at memories of the client 110 and then transferred to storages of the server 310 or memories of the client 130 in response to placing control commands to take photos by the client 110 or 130.

Figure 8:
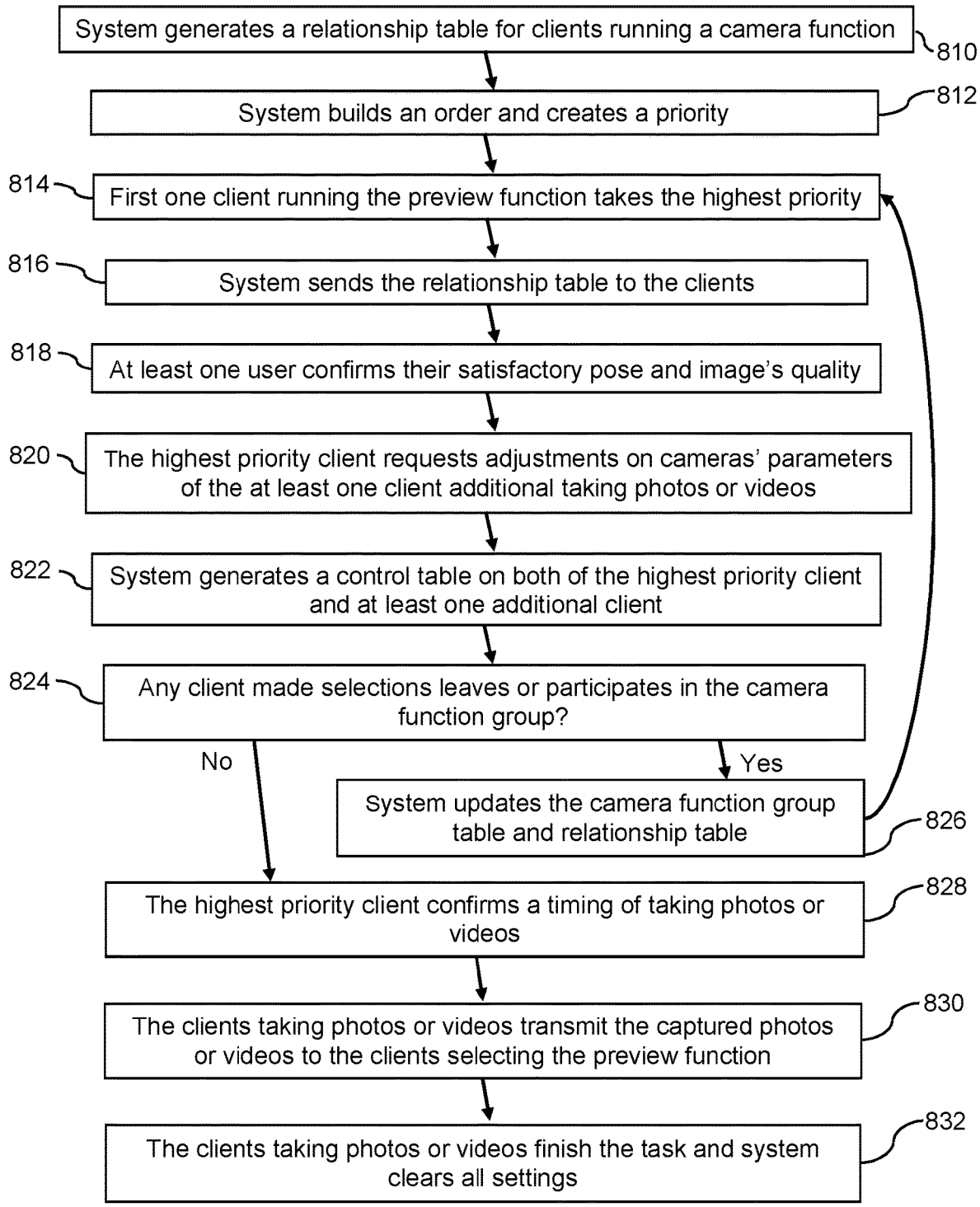
FIG. 8 is a flowchart of a process for transferring preview stream of cameras.

FIG. 8 is a flowchart of a process for transferring preview stream of cameras. At box 810, system generates a relationship table for clients running a camera function. First of all, the computing systems of clients in chat groups may be intended to support the camera function. The clients described herein may be allowed to come from a same chat group or different chat groups. Each client in chat groups may have to first transmit the individual identifier and information to the system via the network 320 in response to executing the camera function. Generally, an initiation of camera function may particularly happen in a situation when they are particularly difficult to check their image through preview streams of their clients, and trigger receiving their current location information for a system to establish a predetermined area. When the clients run the camera function and participate in the predetermined area, the system may generate a camera function group and relationship table for them. The relationship table may be configured to determine the direction of transmitting preview streams, photos or videos between the plurality of clients. Moreover, the camera function group may be built in a chat session function through which users in the camera function group can chat and instruct each other for specific purposes. Other clients executing the camera function late may be intended to transmit their identifiers and position information to the system. The system may compare the position information of these clients with all of positions in the predetermined area, which was set up for the clients executing the camera function in the early stage. Assuming a client executing the camera function does not locate within the predetermined area, the system may reject the client to join the camera function group. In addition, the system may periodically request the position information of clients for monitoring their movements. A client in the camera function group leaves the distance range, the client may be released from the camera function group. According to creating a camera function group for clients executing the camera function, the clients coming from different chat groups may be intended to first acknowledge each other before the camera function group is created.

At box 812, system builds an order and creates a priority. The box 812 represents that when the clients simultaneously run the camera function and participate in the predetermined area, the system may record their timings they execute camera function to form the order. Then, it may be intended to create a priority based on the order for adjusting a set of allowable cameras' parameters of each client executing the function of taking photos or videos. The priority and order may be included into the relationship table. When a client or new client executing the camera function leaves or participates in the predetermined area, it may be intended to updating the relationship table and refresh the order and priority for the plurality of clients executing the function of preview or taking photos or videos.

At box 814, first one client running the preview function takes the highest priority. The box 814 represents that the system may be intended to determine the client executing the function of preview is higher than one executing the function of taking photos or videos in the priority for adjusting the set of allowable cameras' parameters. It may assigns the first one client executing the function of preview in the order owning the highest priority for adjusting the set of allowable cameras' parameters of each client executing the function of taking photos or videos. When the first one client is unavailable, it may substitute subsequent clients executing the function of preview or taking photos or videos in the order to get the highest priority.

At box 816, system sends the relationship table to the clients. The box 816 represents that the system may be intended to establish the relationship table with respect to receiving the selections of clients and then transmit the table to the clients. The relationship table may present the order, priority, their identifiers and selections to the users through the displays of their clients in the camera function group. The relationship table mentioned herein may determine the direction of transmitting preview streams, photos or videos between clients selecting to preview or take photos or videos. According to the relationship table, the clients in the camera function group may capably set up the communication sessions between the clients selecting to preview or take photos or videos by themselves based on the relationship table.

At box 818, at least one user confirms their satisfactory pose and image's quality. The box 818 represents that when a situation of that the distance between clients selecting function of preview or taking photos or videos is too far or the at least one user handling the clients in the camera function group is hard to face at the display of their clients to confirm their satisfactory pose happens, they may deliberately initiate the camera function to solve these problems. So, they handling the clients in the camera function group may be able to confirm their satisfactory pose and image's quality through preview streams of photographing them on their clients. However, if there is a support of a swivel base for a client taking photos or videos, only one user may be able to initiate a camera function with at least two clients executing function of preview or taking photos or videos respectively. Otherwise, the camera function may intentionally be initiated by at least two users and clients executing function of preview or taking photos or videos at the same time. Additionally, a quality of traffic between the clients in the camera function group may influence a performance of confirming their satisfactory pose and image's quality through preview streams of photographing them on their clients. Basically, preview streams may be captured at a predetermined frame rate, such as 30 frames per second, by the clients selecting to take photos or videos. The clients selecting the preview function may also demonstrate preview streams on their displays at the predetermined frame rate in order to meet the requirements of users. During the transmission, the system may be configured to monitor the data rate of the communication sessions between the clients. In one implementation, it may allow the clients in the camera function group can set up the communication sessions between them selecting to preview or take photos or videos by themselves based on the relationship table in order to reduce a latency of transmissions.

According to a traffic information of the network 320, the system may determine the transmission between the clients to go through the server 310 or not. Assuming the network 320 is smoothly and the data rate is regular, the system may determine the transmission of preview streams between the clients without going through the server 310. Assuming the network 320 is a heavy traffic and the data rate is low, the system may determine changing configurations such as the transmission of the preview streams between the clients to intentionally go through the server 310, changing compression rate of the preview frame, the frame rate of the preview streams or a combination of solutions above.

At box 820, the highest priority client requests adjustments on cameras' parameters of the at least one additional client taking photos or videos. It indicates a situation of that the distance between clients selecting function of preview or taking photos or videos is too far or the at least one user handling the clients in the camera function group is hard to face at the display of their clients to confirm their satisfactory pose happens, and then they deliberately initiate the camera function. Meanwhile, a user handling the highest priority client doesn't satisfy image's quality after confirming preview streams of photographing them on their clients, and decides requesting adjustments on cameras' parameters of the at least one client taking photos or videos.

At box 822, system generates a control table on both of the highest priority client and at least one additional client. The box 822 represents that the at least one additional client taking photos or videos provides the allowable cameras' parameters to the highest priority client in response to an acknowledgment of the at least one additional client taking photos or videos. In one implementation, the system may request allowable cameras' parameters of a new client when it registers a service of camera function, and transfer the allowable cameras' parameters to the camera parameters table creation module 710. When the highest priority client wants to adjust the allowable cameras' parameters of the at least one additional client, the camera parameters table creation module 710 may generate a control table in the relationship tables based on the allowable cameras' parameters on their displays of the highest priority client and at least one additional client. A user handling the highest priority client may clearly check an illustration of controls on the allowable cameras' parameters. During an adjustment of the allowable cameras' parameters, the user handling the highest priority client may simultaneously modify a position of the at least one additional client on their control table. The user may capture an image from its preview streams and shift it on the control table to determine the position of the at least one additional client. At the same time, another user handling the at least one additional client may receive the shifted image and be informed to move the at least one additional client according to the shifted image until it reaches the position. Then, the user may deliberately inspect the position through current preview streams of the highest priority client in response to a notification of the at least one additional client when it reaches the position and adjust the allowable cameras' parameters through the control table after acknowledging the position of the at least one additional client. Eventuality, while the position is adjusting, the at least one additional client may be capturing its current preview stream generating consecutive images in order to demonstrate an overlapping image of each of the consecutive images and the shifted image on the control table of the at least one additional client until it reaches the position for inspection by another user. When one of the consecutive images matches the shifted image, the at least one additional client may be intended to notify the highest priority client about that it reaches the position.

At box 824, any client made selections leaves or participates in the predetermined area? The box 824 indicates that any client leaves or participates in the predetermined area after they made selections for selecting the function of preview or taking photos or videos. They can make the selections, it represents that they are registered clients. When they leave or participate in the predetermined area after making the selections, the system may detect them leaving or participating in the predetermined area, then make them released or joined into the camera function group. According to the new client joining into the camera function group, the system may allow the new client to join into the camera function group before a confirmation of taking photos or videos. When a client releasing the camera function group causes that the relationship table is changed to influence connections between the clients existing in the camera function group, the system may terminate all operations of camera function between the clients existing in the camera function group. For example, nobody previews or take photos or videos.

For example, the clients 110, 130 and 140 in FIG. 1 participate in the camera function group, the clients 110 and 130 select to take photos or videos and the client 140 selects a preview function, respectively. When the client 140 leaves the predetermined area, it changes the relationship table to influence connections between the clients 110, 130 and 140, the system may terminate all operations of camera function. On the other hand, the clients 110 and 130 existing in the camera function group select to preview or take photos or videos, respectively. When the client 140 participating the predetermined area selects to either preview or take photos or videos, the system may allow the client 140 to join into their camera function group before the confirmation of the timing to take photos or videos. Assuming any client made selections leaves or participates in the predetermined area, the system may directly run the box 826. Otherwise, the system may determine running the box 828.

At box 826, system updates the camera function group table and relationship table. The box 826 indicates that system is configured to update the camera function group table and relationship table after any client made selections leaves or participates in the predetermined area. Assuming any client made selections leaves or participates in the predetermined area, the system may rearrange the camera function group table, relationship table, an order, priority and the communication session between all the clients in the camera function group, then update the camera function group table and relationship table and jump to run the box 814.

At box 828, the highest priority client confirms a timing of taking photos or videos. The box 828 indicates that the highest priority client confirms a timing of taking photos or videos with other clients in the camera function group. The highest priority client may be a candidate of confirming a timing of taking photos or videos. During the transmission of preview streams between the clients in the camera function group, the highest priority client may be in charge of checking whether other clients selecting the preview function in the camera function group are ready to be taken photos or videos. If the highest priority client confirms a timing of taking photos or videos, it may have to send the "ready" message to the clients selecting to take photos or videos. Moreover, the captured photos or videos may first be stored in the memories of the clients selecting to take photos or videos, then transferred to the storages of the server 310.

At box 830, the clients taking photos or videos transmit the captured photos or videos to the clients selecting the preview function. The box 830 indicates that the clients taking photos or videos may directly transmit the captured photos or videos to the clients selecting the preview function. In some situations, the clients taking photos or videos may first transmit the captured photos or videos to the server 310, then the server 310 may transfer them to the clients selecting the preview function. The system may determine the method of delivering the photos or videos between the clients in the camera function group. For example, the system may be intended to deliver a photo or all of photos to the clients selecting the preview function, or request the clients taking photos or videos directly transmitting the photos or videos to the clients selecting the preview function.

At box 832, the clients taking photos or videos finish the task and system clears all settings. The box 832 indicates that the clients taking photos or videos finish the task of taking photos or videos for the clients selecting the preview function, then the system clears all settings. Assuming the activities of taking photos or videos finish, the system may be configured to clear all of the configurations such as camera function group table, new chat group table, communication sessions and additional settings. All of photos or videos storing in the storages of the server 310 may be kept for retrieving by the clients in the camera function group, even if the camera function group was deleted.

Figure 9:
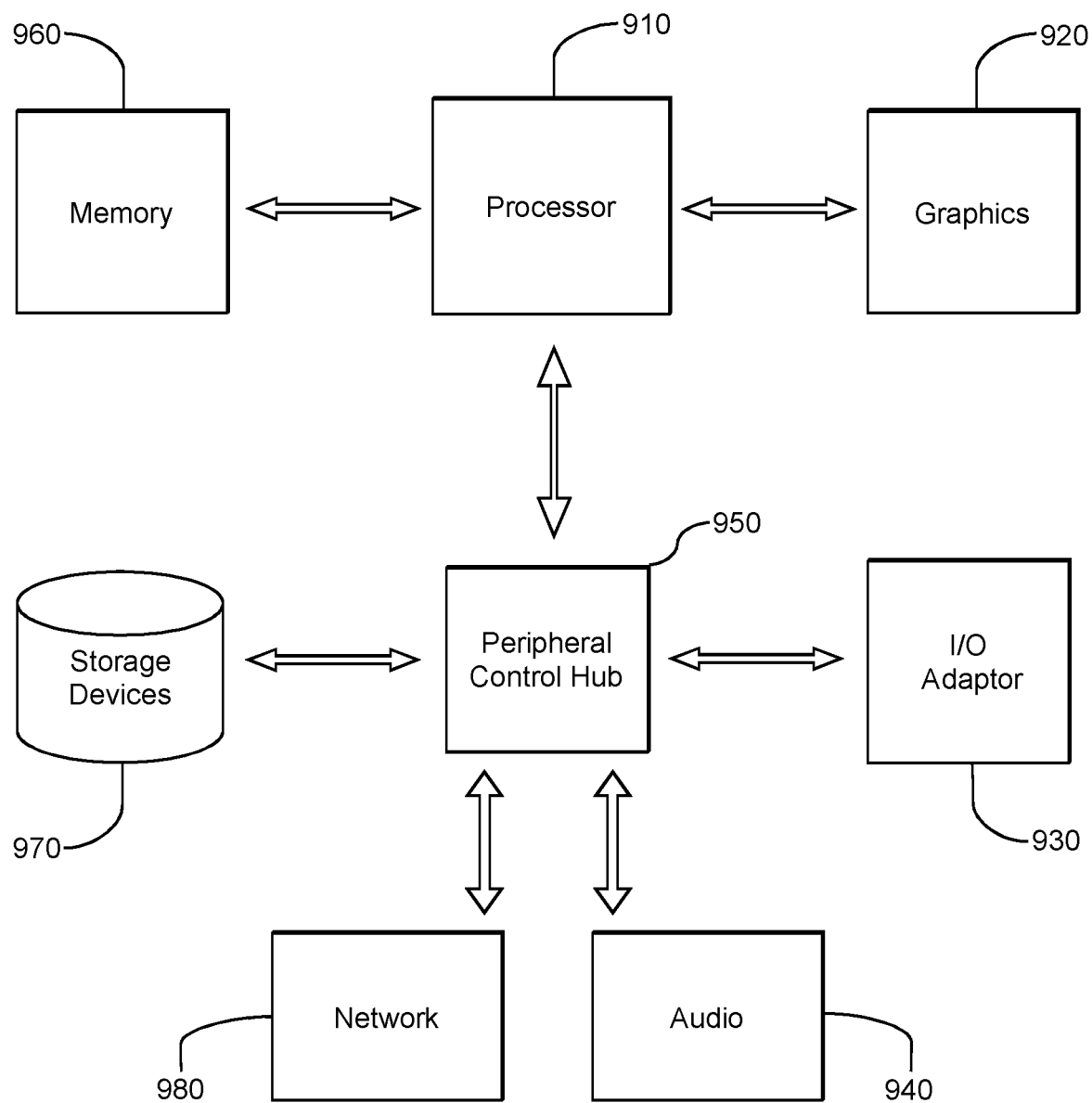
FIG. 9 is a block diagram illustrating components of a computing device that may be used to implement the methods and systems described in the document, as a server or plurality of servers.

FIG. 9 is a block diagram illustrating components of a computing device that may be used to implement the methods and systems described in the document, as either a client or a server. The computing system 900 represents various kinds of computing devices such as desktop, notebook, workstation, server, mainframe, and other similar computing devices. The computing system 900 described herein may be represented as the multiple clients 330 or the server 310. The computing system 900 includes a CPU (Central Processing Unit) 910, a graphics 920, an I/O devices (Input/Output) 930, an audio 940, a peripheral control hub 950, a memory 960, a storage devices 970 and a network 980.

In one implementation, the CPU 910 may consist of multiple CPU chips and interconnect together by using dedicated high-speed interfaces. Each CPU chip has specific high-speed interfaces connecting to graphics 920 and memory 960. The CPU 910 may include a memory controller to interact with the memory 960. The memory 960 may consist of multiple DRAM (Dynamic Random Access Memory) chips and/or modules such as DDR4 SDRAM (Double-Data-Rate Fourth Generation Synchronous Dynamic Random Access Memory) chip or other DRAM chip. In another implementation, the CPU 910 may build in a non-transitory computer-readable medium such as NOR Flash (NOR Gate Flash) for storing instructions.

The peripheral control hub 950 is a processor to interact with a plurality of peripheral devices by using specific low-speed interfaces and connects with I/O devices 930, audio 940, storage devices 970, network 980 and additional peripheral devices. The I/O devices 930 is input or output devices (e.g., mouse, keyboard, USB Hub or LED) used to input data to the peripheral control hub 950 or output data by using specific devices. The audio 940 may include an audio Codec chip for encoding or decoding an audio data stream from or to the peripheral control hub 950 and connect with various sound devices (e.g., speaker or microphone).

The storage devices 970 are non-transitory computer-readable media such as HDD (Hard Disk Drive) and/or SSD (Solid State Drive) for storing various computer programs, apps, photos, videos and other information. In one implementation, the storage devices 970 can be internally, locally or remotely connected to the peripheral control hub 950 by using internal interfaces, SAN (Storage Area Network) or NAS (Network Attached Storage) protocol. The system is intended to execute specific operations, computer programs and/or apps may be loaded from the storage devices 970 to the memory 960. The network 980 can support various technologies, such as Ethernet, Wi-Fi, fiber, or 5G, to connect with the network 320.

Figure 10:
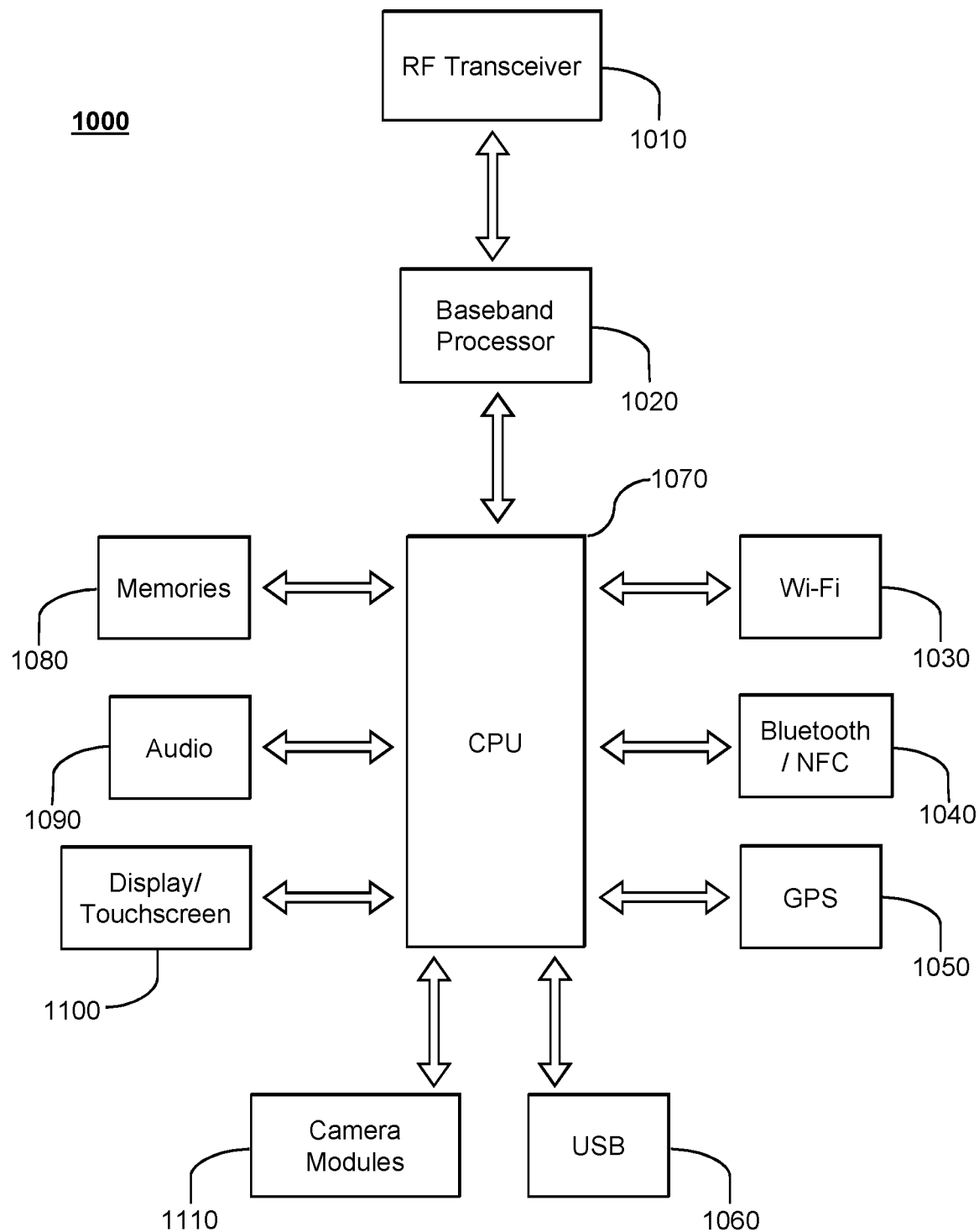
FIG. 10 is a block diagram illustrating components of a computing device that may be used to implement the methods and systems described in the document, as a client or plurality of clients.

FIG. 10 is a block diagram illustrating components of a computing device that may be used to implement the methods and systems described in the document, as a client or plurality of clients. The computing system 1000 represents various kinds of computing devices such as smartphone, Pad, laptop, and other similar computing devices. The computing system 1000 described herein may be represented as the multiple clients (330A, 330B, 330C and 330D). The computing system 1000 includes RF (Radio Frequency) transceiver 1010, baseband processor 1020, Wi-Fi 1030, Bluetooth/NFC (Near-field communication) 1040, GPS 1050, USB 1060, CPU 1070, memories 1080, audio 1090, display 1100 and camera modules 1110.

In one implementation, the CPU 1070 may include multiple CPU cores, memory controller and peripheral bridge, which are interconnected together by using dedicated high-speed interfaces. The memory controller may be intended to connect with memories 1080 by using various buses. The peripheral bridge may be intended to connect with baseband processor 1020, Wi-Fi 1030, Bluetooth/NFC (Near-field communication) 1040, GPS 1050, USB (Universal Serial Bus) 1060, audio 1090, display/touchscreen 1100 and camera modules 1110 by using various buses.

The RF transceiver 1010 may be a component to transmit and receive RF signals through antennas and extract digital signals coupled to the baseband processor 1020, which may include a signal processing unit of baseband supporting various protocols such as 3G, 4G or 5G (5th generation mobile networks). The baseband processor 1020 may also be intended to process data from the CPU 1070 and then transfer to the RF transceiver 1010 in order to transmit data to the network 320 through antennas. The Wi-Fi 1030 may be a component using a wireless networking technology to connect with the network 320. The Bluetooth/NFC 1040 may be a component using short distance wireless technologies to exchange data between the CPU 1070 and desktop or mobile devices such as headsets, mouse, keyboard, printer, card reader and other similar devices.

The GPS 1050 may be a component to receive location-based information and additional data from satellites through an antenna and transfer to the CPU 1070. The USB (Universal Serial Bus) 1060 may be a component to establish a connection between the CPU 1070 and external USB devices such as mouse, keyboard, printer, power charger and other similar devices. The memories 1080 may be implemented as various computer-readable media such as volatile memory, non-volatile memory and expansion memory. The CPU 1070 may directly connect with the volatile memory and non-volatile memory by using dedicated buses. The non-volatile memory such as NAND or NOR Flash is a non-transitory computer-readable media and may be used for storing a set of instructions, various computer programs and apps. The system is intended to execute specific operations, computer programs and/or apps may be loaded from the non-volatile memory to the volatile memory such as SDRAM or other types of DRAM. The expansion memory is a non-transitory computer-readable media such as SSD for storing photos, videos and other information, and connect to the peripheral bridge of the CPU 1070.

The audio 1090 may be implemented by an audio codec and other circuits. The audio codec may be used for encoding an audio digital data stream from the CPU 1070 and decoding audio digital data to an audio analog signal from a devices (e.g., microphone) converting audible sound to electrical signals. In one implementation, the audio 1090 may convert the encoded audio digital data to analog audio signals and transmit to an audible device (e.g., speakers or headsets). Moreover, the audio electrical signals may be intended to convert to the encoded audio digital data and transmit to the peripheral bridge of the CPU 1070. The display/touchscreen 1100 is a component to drive a device of display and touchscreen. The computing system 1000 may support a diversity of display technologies such as TFT (Thin-Film-Transistor Liquid Crystal Display) display, OLED (Organic Light Emitting Diode) display or other appropriate displays. Additionally, the computing system 1000 may support various touchscreen technologies such as resistive, surface acoustic wave, capacitive or other appropriate technologies.

The camera modules 1110 may be implemented by two or more of camera modules. In one implementation, the computing system 1000 may support at least one front-facing and rear-facing camera modules. Additionally, a resolution of rear-facing camera may be higher than one of front-facing camera. The camera modules 1110 may be performed various functions by executing a diversity of programs which are predetermined in the computing system 1000, such as a face-recognition function. In another implementation, the at least one rear-facing camera may implement different functions by using specific lens such as telephoto lens, ultra-wide lens and other appropriate lens.

The foregoing implementations have been illustrated above, and may be implemented individually or in any combination. Additionally, various modifications can be made to the foregoing implementations.

What is claimed is:

1. A method comprising:
  confirming, by at least one user, their satisfactory pose and image's quality through preview streams of photographing them on their clients;
  requesting, by the highest priority client of a plurality of the clients executing a preview function or taking photos or videos, adjustments on cameras' parameters of at least one additional client executing a function of taking photos or videos for improving the quality of their images;
  providing, by the at least one additional client, the allowable cameras' parameters to the highest priority client in response to an acknowledgment of the at least one additional client;
  generating a control table in the relationship tables based on the allowable cameras' parameters on both of the highest priority client and at least one additional client;
  capturing, by the highest priority client, an image from its preview streams for changing position of the at least one additional client;
  shifting, by a user using the highest priority client, the image on their control table to determine the at least one additional client must be moved to the favorite position based on the shifted image;
  moving, by another user handling the at least one additional client, the at least one additional client according to the shifted image until it reaches the favorite position;
  inspecting, by the user, the favorite position through current preview streams of the highest priority client in response to a notification of the at least one additional client when it reaches the favorite position;
  adjusting, by the user, the allowable cameras' parameters through the control table after acknowledging the favorite position of the at least one additional client;
  checking, by the at least one user, their poses shown on their clients while the highest priority client is adjusting the allowable cameras' parameters; and
  notifying, by the highest priority client, other clients it's time taking photos or videos after the highest priority client finishes adjustments of the allowable cameras' parameters and they confirm their poses.

2. The method of claim 1, further comprising:
  Initiating, by at least one user deciding to take photos or videos, a function of preview or taking photos or videos when they are particularly difficult to check their image through preview streams of their clients;
  requesting current location information provided by location components of each client of a plurality of clients, in response to executing the function of preview or taking photos or videos by the plurality of clients; and
  generating a camera function group based on their current location information and relationship table for the plurality of clients executing the function of preview or taking photos or videos, the relationship table determining the direction of transmitting preview streams, photos or videos between the plurality of clients.

3. The method of claim 2, further comprising:
  building an order in which the plurality of clients execute the function of preview or taking photos or video into the relationship table; and
  creating a priority for the plurality of clients in the relationship table according to the order for adjusting a set of allowable cameras' parameters of each client executing the function of taking photos or videos.

4. The method of claim 3, further comprising:
determining the client executing the function of preview is higher than one executing the function of taking photos or videos in the priority for adjusting the set of allowable cameras' parameters;
assigning the first one client executing the function of preview in the order to the highest priority for adjusting the set of allowable cameras' parameters of each client executing the function of taking photos or videos; and
substituting subsequent clients executing the function of preview or taking photos or videos in the order for the highest priority when the first one client is unavailable.

5. The method of claim 1, further comprising:
updating the camera function group and relationship table when a client or new client executing the camera function leaves or participates in the camera function group; and
refreshing the order and priority for the plurality of clients executing the function of preview or taking photos or videos.

6. The method of claim 1, further comprising:
capturing, by the at least one additional client, its current preview streams generating consecutive images while its position is adjusting;
demonstrating overlapping images of each of the consecutive images and the shifted image on the control table of the at least one additional client until it reaches the favorite position; and
notifying, by the at least one additional client, the highest priority client about that it reaches the position in response to one of the consecutive images matches the shifted image.

7. A non-transitory computer-readable medium storing instructions that, when executed by a processor, cause the processor to implement a method comprising:
confirming, by at least one user, their satisfactory pose and image's quality through preview streams of photographing them on their clients;
requesting, by the highest priority client of a plurality of the clients executing a preview function or taking photos or videos, adjustments on cameras' parameters of at least one additional client executing a function of taking photos or videos for improving the quality of their images;
providing, by the at least one additional client, the allowable cameras' parameters to the highest priority client in response to an acknowledgment of the at least one additional client;
generating a control table in the relationship tables based on the allowable cameras' parameters on both of the highest priority client and at least one additional client;
capturing, by the highest priority client, an image from its preview streams for changing position of the at least one additional client;
shifting, by a user using the highest priority client, the image on their control table to determine the at least one additional client must be moved to the favorite position based on the shifted image;
moving, by another user handling the at least one additional client, the at least one additional client according to the shifted image until it reaches the favorite position;
inspecting, by the user, the favorite position through current preview streams of the highest priority client in response to a notification of the at least one additional client when it reaches the favorite position;
adjusting, by the user, the allowable cameras' parameters through the control table after acknowledging the favorite position of the at least one additional client;
checking, by the at least one user, their poses shown on their clients while the highest priority client is adjusting the allowable cameras' parameters; and
notifying, by the highest priority client, other clients it's time taking photos or videos after the highest priority client finishes adjustments of the allowable cameras' parameters and they confirm their poses.

8. The non-transitory computer-readable medium of claim 7, wherein the method further comprises:
Initiating, by at least one user deciding to take photos or videos, a function of preview or taking photos or videos when they are particularly difficult to check their image through preview streams of their clients;
requesting current location information provided by location-aware components of each client of a plurality of clients, in response to executing the function of preview or taking photos or videos by the plurality of clients; and
generating a camera function group based on their current location information and relationship table for the plurality of clients executing the function of preview or taking photos or videos, the relationship table determining the direction of transmitting preview streams, photos or videos between the plurality of clients.

9. The non-transitory computer-readable medium of claim 8, wherein the method further comprises:
building an order in which the plurality of clients execute the function of preview or taking photos or video into the relationship table; and
creating a priority for the plurality of clients in the relationship table according to the order for adjusting a set of allowable cameras' parameters of each client executing the function of taking photos or videos.

10. The non-transitory computer-readable Medium of claim 9, wherein the method further comprises:
determining the client executing the function of preview is higher than one executing the function of taking photos or videos in the priority for adjusting the set of allowable cameras' parameters;
assigning the first one client executing the function of preview in the order to the highest priority for adjusting the set of allowable cameras' parameters of each client executing the function of taking photos or videos; and
substituting subsequent clients executing the function of preview or taking photos or videos in the order for the highest priority when the first one client is unavailable.

11. The non-transitory computer-readable medium of claim 7, wherein the method further comprises:
updating the camera function group and relationship table when a client or new client executing the camera function leaves or participates in the camera function group; and
refreshing the order and priority for the plurality of clients executing the function of preview or taking photos or videos.

12. The non-transitory computer-readable medium of claim 7, wherein the method further comprises:
capturing, by the at least one additional client, its current preview streams generating consecutive images while its position is adjusting;

demonstrating overlapping images of each of the consecutive images and the shifted image on the control table of the at least one additional client until it reaches the favorite position; and notifying, by the at least one additional client, the highest priority client about that it reaches the position in response to one of the consecutive images matches the shifted image.

13. A system comprising:

one or more processors; and one or more non-transitory computer-readable media storing instructions that, when executed by the one or more processors, cause the system to perform operations comprising:

confirming, by at least one user, their satisfactory pose and image's quality through preview streams of photographing them on their clients;

requesting, by the highest priority client of a plurality of the clients executing a preview function or taking photos or videos, adjustments on cameras' parameters of at least one additional client executing a function of taking photos or videos for improving the quality of their images;

providing, by the at least one additional client, the allowable cameras' parameters to the highest priority client in response to an acknowledgment of the at least one additional client;

generating a control table in the relationship tables based on the allowable cameras' parameters on both of the highest priority client and at least one additional client;

capturing, by the highest priority client, an image from its preview streams for changing position of the at least one additional client;

shifting, by a user using the highest priority client, the image on their control table to determine the at least one additional client must be moved to the favorite position based on the shifted image;

moving, by another user handling the at least one additional client, the at least one additional client according to the shifted image until it reaches the favorite position;

inspecting, by the user, the favorite position through current preview streams of the highest priority client in response to a notification of the at least one additional client when it reaches the favorite position;

adjusting, by the user, the allowable cameras' parameters through the control table after acknowledging the favorite position of the at least one additional client;

checking, by the at least one user, their poses shown on their clients while the highest priority client is adjusting the allowable cameras' parameters; and notifying, by the highest priority client, other clients it's time taking photos or videos after the highest priority client finishes adjustments of the allowable cameras' parameters and they confirm their poses.

14. The system of claim 13, wherein the instructions further cause the system to perform operations comprising:

Initiating, by at least one user deciding to take photos or videos, a function of preview or taking photos or videos when they are particularly difficult to check their image through preview streams of their clients;

requesting current location information provided by location-aware components of each client of a plurality of clients, in response to executing the function of preview or taking photos or videos by the plurality of clients; and generating a camera function group based on their current location information and relationship table for the plurality of clients executing the function of preview or taking photos or videos, the relationship table determining the direction of transmitting preview streams, photos or videos between the plurality of clients.

15. The system of claim 14, wherein the instructions further cause the system to perform operations comprising:

building an order in which the plurality of clients execute the function of preview or taking photos or video into the relationship table; and creating a priority for the plurality of clients in the relationship table according to the order for adjusting a set of allowable cameras' parameters of each client executing the function of taking photos or videos.

16. The system of claim 15, wherein the instructions further cause the system to perform operations comprising:

determining the client executing the function of preview is higher than one executing the function of taking photos or videos in the priority for adjusting the set of allowable cameras' parameters;

assigning the first one client executing the function of preview in the order to the highest priority for adjusting the set of allowable cameras' parameters of each client executing the function of taking photos or videos; and substituting subsequent clients executing the function of preview or taking photos or videos in the order for the highest priority when the first one client is unavailable.

17. The system of claim 13, wherein the instructions further cause the system to perform operations comprising:

updating the camera function group and relationship table when a client or new client executing the camera function leaves or participates in the camera function group; and refreshing the order and priority for the plurality of clients executing the function of preview or taking photos or videos.

18. The system of claim 13, wherein the instructions further cause the system to perform operations comprising:

capturing, by the at least one additional client, its current preview streams generating consecutive images while its position is adjusting;

demonstrating overlapping images of each of the consecutive images and the shifted image on the control table of the at least one additional client until it reaches the favorite position; and notifying, by the at least one additional client, the highest priority client about that it reaches the position in response to one of the consecutive images matches the shifted image.

* * * * *